United States Patent
Hamilton, II et al.

(10) Patent No.: US 9,904,442 B2
(45) Date of Patent: Feb. 27, 2018

(54) UPDATING ASSETS RENDERED IN A VIRTUAL WORLD ENVIRONMENT BASED ON DETECTED USER INTERACTIONS IN ANOTHER WORLD

(71) Applicant: INTERNATIONAL BUSINESS MACHINES CORPORATION, Armonk, NY (US)

(72) Inventors: Rick A Hamilton, II, Charlottesville, VA (US); James R Kozloski, Fairfield, CT (US); Brian M O'Connell, Cary, NC (US); Clifford A Pickover, Yorktown Heights, NY (US); Keith R Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 14/813,975

(22) Filed: Jul. 30, 2015

(65) Prior Publication Data
US 2015/0331570 A1 Nov. 19, 2015

Related U.S. Application Data

(63) Continuation of application No. 14/222,087, filed on Mar. 21, 2014, now Pat. No. 9,122,380, which is a
(Continued)

(51) Int. Cl.
*G06F 3/048* (2013.01)
*G06F 3/0484* (2013.01)
(Continued)

(52) U.S. Cl.
CPC ............ *G06F 3/0484* (2013.01); *G06F 3/011* (2013.01); *G06F 17/30598* (2013.01); *G06Q 30/02* (2013.01)

(58) Field of Classification Search
CPC .. G06F 3/0484; G06F 3/011; G06F 17/30598; G06Q 30/02
See application file for complete search history.

(56) References Cited

U.S. PATENT DOCUMENTS 7,580,861 B1   8/2009 Song
8,161,397 B2   4/2012 Kalaspur et al.
(Continued)

OTHER PUBLICATIONS

Office Action, dated Jan. 18, 2012, U.S. Appl. No. 12/548,889, filed Aug. 27, 2009, in Re Rick Allen Hamilton II, 28 pages.
(Continued)

*Primary Examiner* — Techane Gergiso
(74) *Attorney, Agent, or Firm* — David B. Woycechowsky; Amy J. Pattillo (57) ABSTRACT

A settings controller outputs a settings interface through which a user may select from among multiple selectable options to specify one or more data associations in databases accessed by an asset location controller to selectively assign a detected user interaction in another world to a displayable rendering in a virtual world based on a selection of the one or more data associations applicable to the detected user interaction and the virtual world. The settings controller, responsive to a user selecting, through the settings interface, one or more particular selectable options to enter one or more particular data associations for one or more particular databases, assigns the one or more particular data associations to the one or more particular databases for specifying the displayable rendering of the detected user interaction in the another world to the displayable rendering in the virtual world.

9 Claims, 5 Drawing Sheets

Related U.S. Application Data continuation of application No. 13/619,688, filed on Sep. 14, 2012, now Pat. No. 8,719,731, which is a continuation of application No. 12/548,889, filed on Aug. 27, 2009, now Pat. No. 8,307,308.

(51) Int. Cl.
*G06F 17/30* (2006.01)
*G06F 3/01* (2006.01)
*G06Q 30/02* (2012.01)

(56) References Cited

U.S. PATENT DOCUMENTS

| | | | |
|---|---|---|---|
| 8,307,308 B2 | 11/2012 | Hamilton, II et al. | |
| 8,321,787 B2 | 11/2012 | Castelli et al. | |
| 8,719,731 B2 | 5/2014 | Hamilton, II et al. | |
| 8,965,787 B2 * | 2/2015 | Bonev | G06Q 30/00 705/14.49 |
| 9,191,238 B2 * | 11/2015 | Douris | H04L 12/6418 |
| 2001/0033675 A1 | 10/2001 | Maurer et al. | |
| 2002/0138607 A1 | 9/2002 | O'Rourke | |
| 2002/0178072 A1 | 11/2002 | Gusler et al. | |
| 2004/0193441 A1 | 9/2004 | Altieri | |
| 2005/0125229 A1 | 6/2005 | Kurzweil | |
| 2005/0192864 A1 | 9/2005 | Ganz | |
| 2006/0059049 A1 | 3/2006 | Morris et al. | |
| 2006/0143091 A1 | 6/2006 | Yuan et al. | |
| 2006/0152434 A1 | 7/2006 | Sauer | |
| 2007/0003915 A1 | 1/2007 | Templeman | |
| 2007/0060345 A1 | 3/2007 | Edwards | |
| 2007/0060346 A1 | 3/2007 | Edwards | |
| 2007/0112574 A1 * | 5/2007 | Greene | G06F 9/5072 340/572.1 |
| 2007/0124216 A1 | 5/2007 | Lucas | |
| 2007/0168863 A1 * | 7/2007 | Blattner | G06F 3/011 715/706 |
| 2007/0211047 A1 | 9/2007 | Doan | |
| 2007/0250901 A1 * | 10/2007 | McIntire | H04N 7/17318 725/146 |
| 2008/0071750 A1 | 3/2008 | Schloter | |
| 2008/0081694 A1 | 4/2008 | Hong et al. | |
| 2008/0082424 A1 | 4/2008 | Walton | |
| 2008/0255957 A1 | 10/2008 | Erdem et al. | |
| 2008/0263460 A1 | 10/2008 | Altberg et al. | |
| 2009/0008450 A1 | 1/2009 | Ebert et al. | |
| 2009/0037905 A1 | 2/2009 | Hamilton, II | |
| 2009/0043658 A1 | 2/2009 | Webb et al. | |
| 2009/0119764 A1 | 5/2009 | Applewhite et al. | |
| 2009/0158210 A1 * | 6/2009 | Cheng | G06Q 10/10 715/810 |
| 2009/0171901 A1 | 7/2009 | Bathiche et al. | |
| 2009/0209236 A1 | 8/2009 | Bloebaum et al. | |
| 2009/0210483 A1 | 8/2009 | Pierce et al. | |
| 2009/0216549 A1 | 8/2009 | Causey et al. | |
| 2009/0253494 A1 | 10/2009 | Fitch et al. | |
| 2009/0254843 A1 * | 10/2009 | Van Wie | H04L 12/1822 715/757 |
| 2009/0276356 A1 * | 11/2009 | Scipioni | G06Q 20/10 705/41 |
| 2010/0122174 A1 * | 5/2010 | Snibbe | G06Q 10/10 715/733 |
| 2010/0169799 A1 | 7/2010 | Hyndman et al. | |
| 2010/0333031 A1 | 12/2010 | Castelli et al. | |
| 2011/0055927 A1 | 3/2011 | Hamilton et al. | |
| 2013/0014034 A1 | 1/2013 | Castelli et al. | |
| 2013/0061157 A1 | 3/2013 | Hamilton et al. | |
| 2014/0208240 A1 | 7/2014 | Hamilton, II et al. | |

OTHER PUBLICATIONS

Notice of Allowance, dated Jun. 25, 2012, U.S. Appl. No. 12/548,889, filed Aug. 27, 2009, In Re Rick Allen Hamilton II, 23 pages.
Notice of Allowance, U.S. Appl. No. 12/494,737, filed Jun. 30, 2009, Vittorio Castelli, dated Jun. 22, 2012, 12 pages.
Office Action, U.S. Appl. No. 12/494,737, filed Jun. 30, 2009, Vittorio Castelli, dated Apr. 6, 2012, 21 pages.
Notice of Allowance, U.S. Appl. No. 13/619,688, filed Sep. 14, 2012, Rick A. Hamilton II, dated Dec. 23, 2013, 33 pages.
Office Action, U.S. Appl. No. 14/222,087, filed Mar. 21, 2014, In re Rick A. Hamilton II, dated Dec. 2, 2014, 13 pages.
Notice of Allowance, U.S. Appl. No. 14/222,087, filed Mar. 21, 2014, In re Rick A. Hamilton II, dated Apr. 24, 2015, 27 pages.
"How to Activate/Deactivate Tilt Controls", accessed via the Internet from <http://en-americas-support.nintendo.com/app/answers/detail/a_id/22763/~/how-to-activate%2Fdeactivate-tilt-controls-%28mario-kart-8-deluxe%29> as of Aug. 30, 2017, 2 pages.
"How do I perform a gesture?", Second Life Community forum, accessed via the Internet from <https://community.secondlife.com/forums/topic/29372-how-do-i-perform-a-gesture/> as of Aug. 30, 2017, 5 pages.

* cited by examiner

UPDATING ASSETS RENDERED IN A VIRTUAL WORLD ENVIRONMENT BASED ON DETECTED USER INTERACTIONS IN ANOTHER WORLD

CROSS-REFERENCE TO RELATED APPLICATIONS

This application is a continuation of commonly assigned U.S. patent application Ser. No. 14/222,087, filed Mar. 21, 2014, which is a continuation of U.S. patent application Ser. No. 13/619,688, filed Sep. 14, 2012, which is a continuation of U.S. patent application Ser. No. 12/548,889, filed Aug. 27, 2009, hereby incorporated herein by reference.

BACKGROUND

1. Technical Field

This invention relates in general to virtual environments, and more particularly to a method, system, and computer program for updating assets rendered in a virtual world environment based on user interactions in another world.

2. Description of the Related Art

A virtual world, also commonly referred to as 3D Internet or a virtual universe, is a computer-based simulated environment in which one or more users traverse and interact within the environment. In a virtual world, a user is typically provided with an avatar to represent the user within the virtual world, where the user and other users can see the avatar. Virtual worlds are often simulated in a two or three-dimensional environment, including graphics, video, text, and other representations, which may, for example, resemble the real world, represent a fictitious world, or depict a gaming world. Users within a virtual world often conduct business and engage in social interactions based on the representations of each user's avatars at one or more locations within a virtual world.

In addition, some virtual world providers provide and render assets within a user's virtual world environment, such as providing a clothing asset used to define the clothing worn by a user's avatar representation within the virtual world environment, a digital media asset such as music played from the virtual world environment, or a decoration asset used to define the décor of a user's space within the virtual world environment. For example, a virtual world called Second Life (Second Life is a registered trademark of Linden Research Inc.) provided on the Second Life platform supports rendering assets within a virtual world environment in association with the user's virtual world account with Second Life.

BRIEF SUMMARY

In view of users traversing virtual worlds and accessing assets, including holding meetings within a virtual world or traveling to a virtual world location simulating a real world location, one or more embodiments of the invention provide a method, system, and computer program product for updating assets rendered in a virtual world environment based on tracked user interactions, such as locations and events, within another world, such as the real world or another virtual world, where a user's interactions within another world trigger rendering of a counterpart asset in the virtual world.

In one embodiment, a method is directed to outputting, by one or more computer systems, a settings interface through which a user selects from among a plurality of selectable options to specify one or more data associations in a plurality of databases accessed by an asset location controller to selectively assign a detected user interaction in another world to a displayable rendering in a virtual world based on a selection of the one or more data associations applicable to the detected user interaction and the virtual world, wherein the detected user interaction identified within the another world is within a real world separate from the virtual world accessible by the user, the detected user interaction received in an identifier from a device that detects and reports user interactions within the another world, wherein the user is an individual user. The method is directed to displaying, by the one or more computer systems, the settings interface comprising a particular selectable option from among the plurality of selectable options to specify the data associations by assigning a separate trigger tag name to a detectable user interaction, the detectable user interaction matching the detected user interaction, wherein the device that detects and reports user interactions within the another world receives the identifier from a radio frequency identification device (RFID) positioned within the real world, the RFID reporting a location and product information to the device when readable by the device with the user within the real world. The method is directed to, responsive to a user selecting, through the settings interface, one or more particular selectable options to enter one or more particular data associations for one or more particular databases of the plurality of databases, assigning, by the one or more computer systems, the one or more particular data associations to the one or more particular databases for specifying the displayable rendering of the detected user interaction in the another world to the displayable rendering in the virtual world. The method is directed to, responsive to the user selecting, through the settings interface, a particular trigger tag name for the detectable user interaction, assigning, by the one or more computer systems, the particular trigger tag name to the detectable user interaction in a trigger tag database from among the plurality of databases, wherein the trigger tag database comprises a plurality of trigger tag names each assigned to a separate detectable user interaction from among a plurality of detectable user interactions each representing a separate physical user interaction detectable in the another world.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to output a settings interface through which a user selects from among a plurality of selectable options to specify one or more data associations in a plurality of databases accessed by an asset location controller to selectively assign a detected user interaction in another world to a displayable rendering in a virtual world based on a selection of the one or more data associations applicable to the detected user interaction and the virtual world, wherein the detected user interaction identified within the another world is within a real world separate from the virtual world accessible by the user, the detected user interaction received in an identifier from a device that detects and reports user interactions within the another world, wherein the user is an individual user. The stored program instructions comprise program instructions to display the settings interface comprising a particular selectable option from among the plurality of selectable options to specify the data associations by assigning a separate trigger tag name to a detectable user interaction, the detectable user interaction matching the detected user interaction, wherein the device that detects and reports user interactions within the another world receives the identifier from a radio frequency identification device (RFID) positioned within the real world, the RFID reporting a location and product information to the device when readable by the device with the user within the real world. The stored program instructions comprise program instructions, responsive to a user selecting, through the settings interface, one or more particular selectable options to enter one or more particular data associations for one or more particular databases of the plurality of databases, to assign the one or more particular data associations to the one or more particular databases for specifying the displayable rendering of the detected user interaction in the another world to the displayable rendering in the virtual world. The stored program instructions comprise program instructions, responsive to the user selecting, through the settings interface, a particular trigger tag name for the detectable user interaction, to assign the particular trigger tag name to the detectable user interaction in a trigger tag database from among the plurality of databases, wherein the trigger tag database comprises a plurality of trigger tag names each assigned to a separate detectable user interaction from among a plurality of detectable user interactions each representing a separate physical user interaction detectable in the another world.

In another embodiment, a computer program product comprises one or more computer-readable storage devices, and program instructions, stored on at least one of the one or more storage devices. The stored program instructions comprise program instructions to output a settings interface through which a user selects from among a plurality of selectable options to specify one or more data associations in a plurality of databases accessed by an asset location controller to selectively assign a detected user interaction in another world to a displayable rendering in a virtual world based on a selection of the one or more data associations applicable to the detected user interaction and the virtual world, wherein the detected user interaction identified within the another world is within a real world separate from the virtual world accessible by the user, the detected user interaction received in an identifier from a device that detects and reports user interactions within the another world, wherein the user is an individual user. The stored program instructions comprise program instructions to display the settings interface comprising a particular selectable option from among the plurality of selectable options to specify the data associations by assigning a separate trigger tag name to a detectable user interaction, the detectable user interaction matching the detected user interaction, wherein the device that detects and reports user interactions within the another world receives the identifier from a radio frequency identification device (RFID) positioned within the real world, the RFID reporting a location and product information to the device when readable by the device with the user within the real world. The stored program instructions comprise program instructions, responsive to a user selecting, through the settings interface, one or more particular selectable options to enter one or more particular data associations for one or more particular databases of the plurality of databases, to assign the one or more particular data associations to the one or more particular databases for specifying the displayable rendering of the detected user interaction in the another world to the displayable rendering in the virtual world. The stored program instructions comprise program instructions, responsive to the user selecting, through the settings interface, a particular trigger tag name for the detectable user interaction, to assign the particular trigger tag name to the detectable user interaction in a trigger tag database from among the plurality of databases, wherein the trigger tag database comprises a plurality of trigger tag names each assigned to a separate detectable user interaction from among a plurality of detectable user interactions each representing a separate physical user interaction detectable in the another world.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

Figure 1:
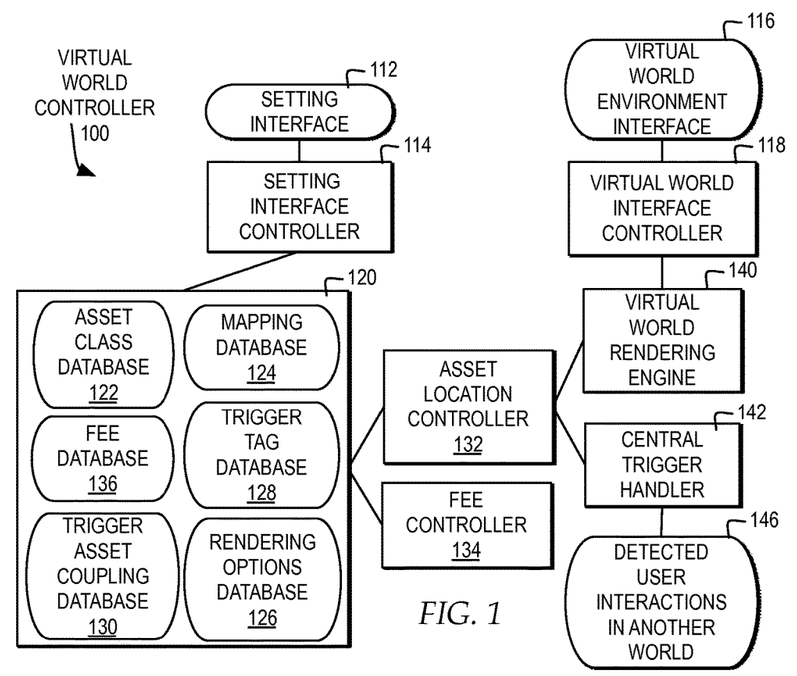
FIG. 1 is a block diagram depicting one embodiment of a virtual world controller for updating assets rendered in a virtual world environment based on detected user interactions within another world, such as the real world or another virtual world.

Referring now to FIG. 1, a block diagram depicts one embodiment of a virtual world controller for updating assets rendered in a virtual world environment based on detected user interactions within another world, such as the real world or another virtual world.

In the depicted example, a virtual world rendering engine 140 of virtual world controller 100 represents the distributed engines, components, scripts, modules, and data for supporting one or more virtual world sessions for accessing one or more virtual worlds provided by one or more virtual world providers. A virtual world implements a simulated computing based environment, which may include two and three dimensional graphics, text, audio, video, and other elements in which a user interacts. A virtual world provider may be the provider of one or more of the hardware, software, or network elements of a virtual world. In particular, a virtual world provider may provide proprietary hardware, software, or network elements for a virtual world or may provide open source based hardware, software, or network elements for a virtual world. In addition, a virtual world provider may manage a virtual world platform on which one or more virtual worlds run, where the virtual worlds that run on the virtual world platform may be interoperable with one another but not interoperable with any other virtual worlds run on any other virtual world platforms provided by any other virtual world providers.

In particular, virtual world rendering engine 140 specifies a virtual world environment for a particular user, which virtual world rendering engine 140 pushes to virtual world interface controller 118. Virtual world interface controller 118 manages output of the specified virtual world environment within virtual world environment interface 116 and returns user inputs within virtual world environment interface 116 to virtual world rendering engine 140. In one example, virtual world environment interface 116 is a graphical user interface.

Virtual world rendering engine 140 adjusts the assets rendered within a virtual world environment responsive to a user interacting within virtual world environment interface 116, responsive to other users interacting within the virtual world represented within virtual world interface 116, and responsive to the virtual world provider updating the virtual world represented within virtual world interface 116. In addition, virtual world rendering engine 140 adjusts the assets rendered within a virtual world environment based on a user's interactions with another world, such as the real world or another virtual world environment. Those of ordinary skill in the art will appreciate that virtual world rendering engine 140 may also adjust the virtual world environment pushed to virtual world interface controller 118 based on other types of inputs and changes.

In the example, virtual world rendering engine 140 receives instructions from an asset location controller 132 for adjusting the rendering of the virtual world environment displayed within virtual world environment interface 116 based on a user's interactions within another world. Asset location controller 132 interfaces with a central trigger handler 142 for receiving indicators of user interactions within another world, as illustrated at reference numeral 146.

Detected user interactions within another world as illustrated at reference numeral 146 may include one or more types of information including, but not limited to, global positioning system (GPS) location coordinates, triangulated cellular telephone position coordinates, information collected from radio frequency identification devices (RFIDs), virtual world environment location coordinates from another virtual world environment, identifiers for assets viewed in another virtual world environment, and other location and event based information. In one example, RFIDs may be positioned throughout the real world and supply location information, product information, and other types of information which identifies what type of user interaction a user has within the real world when the RFID is readable by a device associated with the user in the real world. RFIDs and other placed devices that provide information about user interaction within the real world may be referred to as an embedded trigger device in the real world. As will be further described with reference to FIG. 2, multiple types of systems may report detected user interactions within another world as illustrated at reference numeral 146 to central trigger handler 142.

A user, which may reference one or more of an individual user, a virtual world provider, or a third party entity, may set the parameters for specifying the adjustments to be made to the rendering of assets directed by asset location controller 132 in response to detected user interactions in another world. In the example, a setting interface controller 114 manages output of a selectable interface within setting interface 112 through which a user selects parameters for specifying the adjustments to the rendering of assets according to location based triggers and setting interface controller 114 manages storage in location storage parameters 120 of selections of parameters by the user within setting interface 112. In one example, setting interface 112 is a graphical user interface. Those of ordinary skill in the art will appreciate that a user may also set and store parameters within location storage parameters 120 through additional or alternate interfaces of location storage parameters 120 or of individual databases referred to within location storage parameters 120. In addition, those of ordinary skill in the art will appreciate that the databases described within location storage parameters 120 may be stored in one or more types of data storage structures in one or more computing systems, such as computing system 300 described with reference to FIG. 3 and distributed across a network of computing systems, as described with reference to FIG. 2.

In particular, in the example, location storage parameters 120 include an asset class database 122. Asset class database 122 includes a database of assets each assigned an asset class identifier that provides a description of the asset. A user may assign an asset class to an asset in asset class database 122 via setting interface 112 where the asset class includes a descriptive name, a user identifier, a virtual world identifier, and other identification. In addition, a user may host an asset assigned to an asset class in asset class database 122, where that asset is available to other users for rendering in other user virtual world environments. Assets may include, but are not limited to, graphical objects, data objects, scripts, audio files, animations, electronic documents, video files, avatar parts, avatar clothing, avatar tools, avatar gestures, calling cards, bookmarked locations, geographical information, note cards, photos, applications, textures, deleted items, and other items renderable or accessible within a virtual world environment. Assets may be represented by an object descriptor file in extensible Markup Language (XML). Assets may include executable software code that is renderable in a virtual world environment and nonexecutable data that may be used by a virtual world rendering engine 140 to render the assets. In addition, assets may include items shared by multiple users within a virtual world and items placed within landscapes or other structures of a particular virtual world environment.

Asset location controller 132 may direct virtual world rendering engine to render an instance of an asset assigned to a selected asset class. In one example, each asset class within asset class database 122 may also be identified by the virtual world provider by a Universally Unique Identifier (UUID), where a UUID is a 16-byte number that may be generated by a pseudorandom number generator. Each inventory item may be assigned a UUID that is tied to textual coordinates, graphic files, data files, audio files, scripts, and other data for each item. Asset location controller 132 may direct virtual world rendering engine 140 to render a new instance of an asset with the asset identified by UUID.

In the example, location storage parameters 120 also include a trigger tag database 128. Trigger tag database 128 includes a database of trigger tags each assigned to a specific user interaction, such as a location or event, within at least one other world. In addition, trigger tag database 128 records, with each trigger tag, a trigger event history of the user ID's for user interactions that have matched the specific user interaction associated with the trigger tag and other information about the trigger. In the example, a user may assign a trigger tag to a user interaction, such as a location or event identifier within another world, within trigger tag database 128 through setting interface 112. For example, an individual user may assign a first trigger tag to a first measurable radius around a first store location in the physical, real world and the user may assign a second trigger tag to a second measurable radius around the first store location. In another example, a virtual world provider user may assign a first trigger tag to a location within another virtual world environment, such as a virtual coffee shop location within another virtual world environment. In yet another example, a third party entity user may assign a first trigger tag to an event specified by a customer interaction with a particular product, such as a customer bringing a clothing item into a dressing room location or a customer purchasing a clothing item at a register location, where a first RFID detectable within a dressing room or at a register identifies the customer location and a second RFID attached to a clothing item identifies the clothing item.

In addition, in the example, location storage parameters 120 include a trigger asset coupling database 130. Trigger asset coupling database 130 includes a database of couplings each of one or more triggers associated with an asset class. In addition, a coupling may include an additional coupling rule which specifies additional conditions to be met for asset location controller 132 to direct virtual world rendering engine 140 to render a coupled asset within a virtual world environment. For example, a coupling rule may tie a trigger asset coupling to a coupling rule that specifies a particular period of time that a particular trigger asset coupling is to be in effect. In particular, by coupling one or more triggers to an asset class, a user effectively ties an asset's rendering within virtual world environment interface 116 to a user interacting within another world and encountering a triggering location or event in the other world.

In the example, location storage parameters 120 also include a mapping database 124. Mapping database 124 includes a database of trigger asset couplings assigned to mapping rules for specifying where and how to render a coupled asset within a virtual world environment when triggered. A mapping rule may specify a static location or may specify a rule for determining a dynamic location within a virtual world environment specific to the user. For example, a static mapping rule may specify "when trigger in a real store A window occurs in the real world, render the asset 'current window display for store A' within the virtual window display for the virtual counterpart of store A in the virtual world environment." In another example, a dynamic mapping rule may specify "when trigger in dressing room of real store A by a clothing item occurs in the real world, render the clothing asset counterpart within the user's virtual home closet within the virtual world environment." In yet another example, a dynamic mapping rule may specify a mapping location within a virtual world environment, such as a "travel log space", and also specify a mapping reference to the real world for positioning assets within the "travel log space", such as "when street corner trigger $34^{th}$ and $5^{th}$ avenue in New York City is detected, render a virtual store A at a location relative to the center of the user's travel log space proportional to the offset of the corner from New York City's geographical center". In yet a further example, through a mapping rule setting, a user may specify a particular advertising region within the user's virtual world environment for cumulatively placing all assets which are of an asset class of "advertisement" that are triggered in trigger asset coupling database 130 based on a user's interactions within the real world and any other virtual world environments visited throughout the day, such that a user may visit this advertising region at the end of the day and review the virtual advertising counterpart of advertising for real world advertisements and other virtual world environment advertisements the user interacted with throughout the day.

In addition, in the example, location storage parameters 120 also include a rendering options database 126. Rendering options database 126 includes a database of rendering settings specified by a user for controlling asset location controller 132. In one example, rendering options database 126 may include settings for how and when detected user interactions in another world that match one or more trigger tags in trigger tag database 128 are recorded and applied. For example, a user may specify a rendering setting to trigger virtual world rendering engine 140 to trigger an alarm sound whenever a user's detected interactions in another world match the location or event specified in a trigger tag in trigger tag database 128 and offer the user the option to accept rendering of the particular assets coupled to the matching trigger tags or to always or never accept new assets within the user's virtual world environment based on the current location of the user within the real world. In addition, a user may specify a rendering setting to trigger virtual world rendering engine 140 to automatically select not to render particular types of assets or triggers based on a time of day or other factors. In another example, a business hosting an asset within asset class database 122 may specify a rendering setting in rendering options 126 for that asset in virtual world environments of other users which limits the rendering of the asset in other user's virtual world environments. For example, a third party entity hosting an asset may specify a rendering setting tying an asset's rendering to the first selection of individual users who physical visit a particular location starting at a particular time or tying an asset's rendering to not rendering the asset in user virtual world environments of individual users identified as exempted from receiving the asset based on keyword filtering, time of day, or other factors.

In the example, location storage parameters 120 also include a fee database 136. Fee database 136 may include fees charged to a user, limits on a number of assets that can be rendered which require fees to prevent system overload, fees set by a user for charging for an asset, fees paid to a user for access to or a copy of an asset, or fees paid to a user by a third party entity for a user maintaining an RFID or other real world embedded trigger point. In the example, asset location controller 132 may determine whether any fees are applicable for an asset to be rendered based on the settings in fee database 136 and fee controller 134 controls the process of negotiating and transferring fees between individuals, the virtual world provider, and third party entities, as applicable. In one example, in exchange for a user providing an RFID for a particular location or event within the real world, each time asset location controller 132 detects a user interaction in the real world report the particular location or event, fee controller 134 controls micropayments of a fee by a third party entity to the user, where the third party entity has assigned a trigger asset coupling in trigger asset coupling database 130 coupling the trigger tag assigned to the particular location or event with an asset hosted by the third party entity. In another example, a marketing business user may establish trigger asset couplings for a client's marketing assets and fee controller 134 will charge the client a fee on behalf of the virtual world provider for each placement of the asset by asset location controller 132 on behalf of the virtual world provider within hosted virtual world environments and may adjust the fee based on the hosted location within the hosted virtual world environments, the time of day, the user virtual world environments in which the asset is placed, and other factors.

Although not depicted, those of ordinary skill in the art will appreciate that a virtual world provider of a virtual world may provide an interface through which a user may register for a virtual world account and establish initial account information. A user may acquire assets in association with the virtual world account, wherein upon an authenticated login by the user to the virtual world account from any virtual world client, the user enters into a virtual world environment specified for the user based on the settings in the user's account, with access to the assets.

In addition, in association with a user's account, a user may set one or more of the parameters set in location storage parameters 120 to be identified with the user's account. In addition, a user may subscribe to a group from the user's account, where location storage parameters 120 include parameters applicable by a virtual world provider to all the users in the group. Additionally, a user may set, in association with the user's account, parameters within location storage parameters 120 for the virtual world provider to apply to other user accounts hosted by the virtual world provider. Further, a virtual world provider may set parameters within location storage parameters 120.

Figure 2:
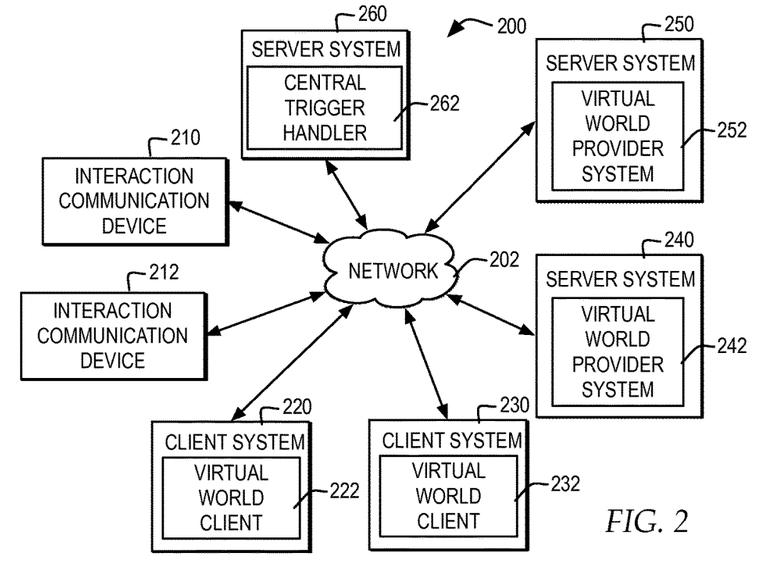
FIG. 2 is a block diagram illustrating one embodiment of a network environment in which a virtual world controller is implemented.

With reference now to FIG. 2, a block diagram illustrates one embodiment of a network environment in which a virtual world controller is implemented. One of ordinary skill in the art will appreciate that network environment 200 is illustrative of one type of network environment that may support clients, servers and other components of a communication system. In addition, one of ordinary skill in the art will appreciate that the distribution of systems within network environment 200 is illustrative of a distribution of systems, however, other distributions of systems within a network environment may be implemented.

As illustrated, multiple systems within network environment 200 may be communicatively connected via network 202, which is the medium used to provide communications links between various devices and computer systems communicatively connected. Network 202 may include permanent connections such as wire or fiber optics cables and temporary connections made through telephone connections and wireless transmission connections, for example, and may include routers, switches, gateways and other hardware to enable a communication channel between the systems connected via network 202. Network 202 may represent one or more of packet-switching based networks, telephony based networks, and local area and wire area networks.

Network 202 and the systems communicatively connected within network environment 200 via network 202 may implement one or more layers of one or more types of network protocol stacks which may include one or more of a physical layer, a link layer, a network layer, a transport layer, a presentation layer, and an application layer. For example, network 202 may implement one or more of the Transmission Control Protocol/Internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another.

Network environment 200 may implement multiple types of network architectures. In one example, network environment 200 may be implemented using a client/server architecture, where computing systems requesting data or processes are referred to as clients and computing systems processing data requests and processes are referred to as servers. In another example, network environment 200 may be implemented in a peer-to-peer network architecture. In yet another example, network environment 200 may be implemented in a grid architecture. Those of ordinary skill in the art will appreciate that other types of network architectures and combinations of network architectures may be implemented.

In the embodiment, as illustrated, a client system 220 and a client system 230 are communicatively connected via network 202 to one or more of a server system 240, a server system 250, and a server system 260. Each of client system 220, client system 230, server system 240, server system 250, and server system 260 may represent one or more computer systems, such as computer system 300 of FIG. 3, to be described.

In the embodiment, client system 220 and client system 230 host virtual world client 222 and virtual world client 232, respectively, where each of virtual world client 222 and virtual world client 232 implement one or more instances of one or more of setting interface 112 and virtual world environment interface 116, and may also each implement one or more instances of one or more additional components of virtual world controller 100. In implementing one or more instances of setting interface 112 and virtual world environment interface 116, each of virtual world client 222 and virtual world client 232 provides interfaces through which a user may set one or more location based parameters and through which a user may interact with one or more virtual world environments. In addition, each of virtual world client 222 and virtual world client 232 may represent stand-alone software, browser plug-ins, scripts, or other data and a browser for interfacing with one or more other systems.

Server system 240 and server system 250 host virtual world provider system 242 and virtual world provider system 252, respectively, where each of virtual world provider system 242 and virtual world provider system 252 implement one or more instances of virtual world rendering engine 140 and asset location controller 132, and may also each implement one or more instances of one or more additional components of virtual world controller 100. In one embodiment, one or more of virtual world client 222 and virtual world client 232 may invoke virtual world environment instances. For example, server system 240 hosts virtual world provider system 242, which may host one or more instances of a first virtual world provided by a first virtual world provider running atop one or more types of virtual world grids or infrastructures, and server system 250 hosts virtual world provider system 252, which may host one or more instances of a second virtual world provided by a second virtual world provider running atop one or more types of virtual world grids or infrastructures.

In one embodiment, server system 240 and server system 250 each represent a networked environment of multiple server systems and each of virtual world provider system 242 and virtual world provider system 252 operates program instructions of one or more virtual world controllers. A virtual world provider provides the computer instructions or a copy of computer instructions to virtual world provider system 242 and virtual world provider system 252. Virtual world provider system 242 and virtual world provider system 252 each request memory allocations and other hardware resources from server system 240 and server system 250, respectively, each time an instance of a virtual world controller is invoked. By invoking and allocating hardware, virtual world provider system 242 and virtual world provider system 252 each create virtual world environment instances. In general, each virtual world environment instance includes control and management functions for controlling at least one aspect of a virtual world for a particular user account including, but not limited to, the geography or terrain of the virtual world, scripts and objects.

One or more instances and embodiments of each of the databases of location storage parameters 120 may be distributed across virtual world client 222, virtual world client 232, virtual world provider system 242, and virtual world provider system 252. In one example, virtual world provider system 242 or virtual world provider system 252 may maintain instances of one or more of the databases of location storage parameters 120 for a fee.

As illustrated, server system 260 hosts central trigger handler 262, which represents one or more instances of central trigger handler 142 which communicate with one or more of virtual world provider system 242 and virtual world provider system 252. Each of virtual world client 222, virtual world client 232, virtual world provider system 242, and virtual world provider system 252 may also implement an instance of central trigger handler 142.

Central trigger handler 262 and any other instances of central trigger handler 142 implemented by other systems within network environment 200 receive data indicating detected user interactions in another world. In one example, virtual world provider system 242 may report, to central trigger handler 262 or other instances of central trigger handler 142, detected user interactions within a virtual world hosted by virtual world provider system 242, such that virtual world provider system 250 may then access the user interactions in another virtual world as triggers for rendering assets in the user's virtual world environment hosted by virtual world provider system 250. In another example, one or more of interaction communication device 210 and interaction communication device 212 may report, to central trigger handler 262 or other instances of central trigger handler 142, detected user interactions within a real world. As will be further described with reference to FIG. 4, each of interaction communication device 210 and interaction communication device 212 may actually detect user interactions or may report user interactions detected by other devices and reported to one or more of interaction communication devices 210 and 212.

Figure 3:
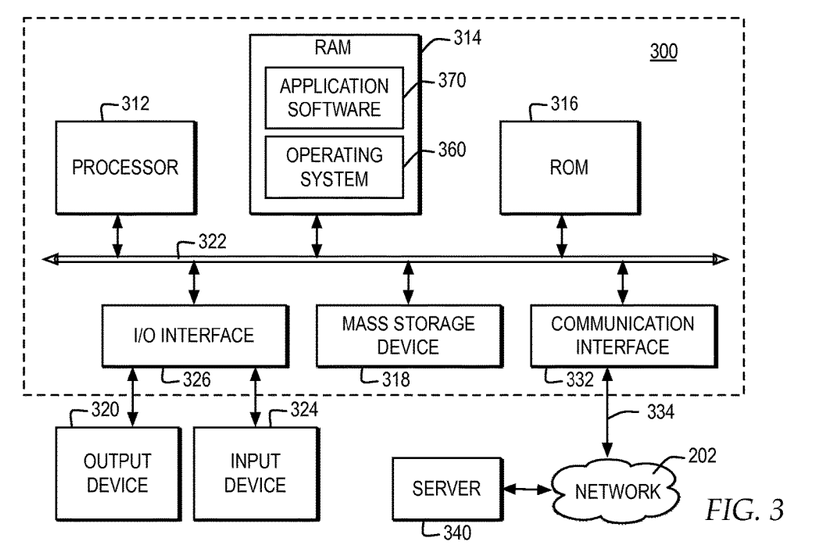
FIG. 3 is a block diagram depicting an example of a computer system in which the present invention may be implemented.

With reference now to FIG. 3, a block diagram illustrates an example of a computer system in which the present invention may be implemented. The present invention may be performed in a variety of systems and combinations of systems, made up of functional components, such as the functional components described with reference to computer system 300 and may be communicatively connected to a network, such as network 202.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, additional controllers (not depicted) for managing bus access and locks may be implemented.

Processor 312 may be at least one general-purpose processor such as IBM's PowerPC (PowerPC is a registered trademark of International Business Machines Corporation) processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. In one embodiment, the operations performed by processor 312 may control the operations of flowchart of FIGS. 6-10 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

Those of ordinary skill in the art will appreciate that the present invention may be embodied as a system, method or computer program product. Accordingly, the present invention may take the form of an entirely hardware embodiment, an entirely software embodiment (including firmware, resident software, micro-code, etc) or an embodiment containing software and hardware aspects that may all generally be referred to herein as "circuit," "module," or "system." Furthermore, the present invention may take the form of a computer program product embodied on any tangible medium of expression having computer-usable program code embodied in the medium.

Any combination of one or more tangible computer usable or computer readable medium(s) may be utilized. The computer-usable or computer-readable medium may be, for example but not limited to, an electronic, magnetic, optical, electromagnetic, infrared, or semiconductor system, apparatus, or storage device. More specific examples (a non-exhaustive list) of the computer-readable medium would include the following: an electrical connection having one or more wires, a portable computer diskette, a hard disk, such as mass storage device 318, a random access memory (RAM), such as RAM 314, a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium refers to any data storage medium that can contain, store, or provide the program for use by or in connection with the instruction executing system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 300, partly on the user's computer, as a stand-alone software package, partly on the user's computer and partly on a remote computer or entirely on the remote computer or server, such as a server 340. In the latter scenario, the remote computer may be connected to the user's computer through any type of network, such as network 202, through a communication interface 332 over a network link 334, that may be connected, for example, to network 202 including a local area network (LAN) or a wide area network (WAN), or the connection may be made to an external computer (for example, through the Internet using an Internet Service Provider). Although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

The present invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 300, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 300, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network link 334 and network 202 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, an image scanning system, a keyboard, a mouse, or other input peripheral device, communicatively enabled on bus 322 via I/O interface 326 controlling inputs. In addition, for example, a display device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 4:
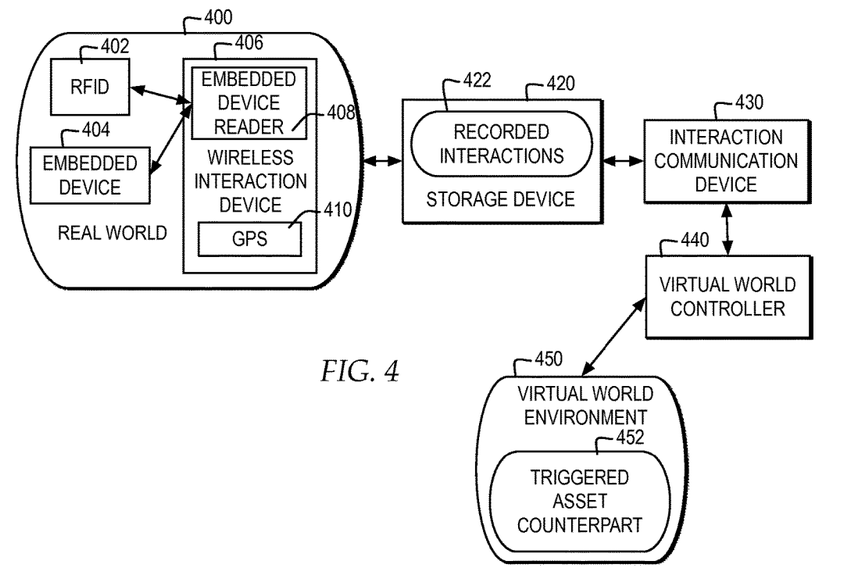
FIG. 4 is a block diagram illustrating one example of detecting user interactions in the real world which act as embedded trigger devices for a user interaction counterpart in a virtual world environment.

With reference now to FIG. 4, a block diagram illustrates one example of detecting user interactions in the real world that act as embedded trigger devices for a user interaction counterpart in a virtual world environment. In the example, a real world 400 represents a world in which a user physically interacts. Real world 400 may include multiple radio frequency identification devices (RFIDs) that passively report information, such as RFID 402, and other embedded devices which actively report information, such as embedded device 404. Each of RFID 402 and embedded device 404 may report a location, an event that has occurred when read, and other information providing context for a user's current interaction within real world 400.

A wireless interaction device 406 includes an embedded device reader 408 which may read information from RFID 402 or embedded device 404 when wireless interaction device 406 is physically located within a proximity to RFID 402 or embedded device 404 within the detection area of embedded device reader 408. In addition wireless interaction device 406 may include a global positioning system (GPS) 410 that detects the current location of wireless interaction device. Further, wireless interaction device 408 may include additional or alternative devices and components for detecting information about a user's interaction within the real world.

A storage device 420, such as flash memory coupled to wireless interaction device 406, records the user interactions detected by wireless interaction device as illustrated at reference numeral 422. Interaction communication device 430 reads recorded interactions 422 from storage device 420 and communication the detected user interactions within real world 400 to virtual world controller 440. Virtual world controller 440 identifies a trigger tag with a trigger definition matching the information in a detected user interaction, identifies an asset coupled to the trigger tag, maps the asset for rendering within a particular location within virtual world environment 450, and renders the asset within virtual world environment 450 as triggered asset counterpart 452.

In the example, as illustrated, the information on RFID 402 or embedded device 404 or a location detected by GPS 410 act as embedded triggers within real world 400, for triggering rendering of counterpart assets within virtual world environment 450. By using embedded triggers in real world 400 for triggering a counterpart asset to be rendered in virtual world environment 450, virtual world environment 450 improves user experience and interaction within the virtual world by placing items within the virtual world that are familiar to the user in the real world. In addition, by using embedded triggers in real world 400 for triggering a counterpart asset to be rendered in virtual world environment 450, virtual world asset creators can create assets to target specific users and to provide an encounter within the virtual world of the counterpart to a location or item already encountered in the real world. A virtual world provider may charge third party entities a fee for placing these counterpart assets within a hosted virtual world and for triggering the counterpart asset responsive to detected user interactions within the real world. Further, by using embedded triggers in real world 400 for triggering a counterpart asset to be rendered in virtual world environment 450, virtual world environment 450 enables a user to identify an encounter between a virtual world resident and some real world object or location, enables a user to identify other uses who are familiar with the appearance and position of certain objects and locations, enables a user to hold virtual world assets in reserve until a user who is familiar with the virtual world asset's appearance and position is identified, and enables renders to accept virtual world assets for rendering in their virtual world locations that will recreate the appearance and experience a user had in a real world encounter with the assets' counterparts.

In one example, a user's cellular telephone or portable communication device incorporates wireless interaction device 406, storage device 420 and interaction communication device 430. In another example, wireless interaction device 408 may only incorporate GPS 410 and storage device 420, where the contents of storage device 420 can be later downloaded to interaction communication device 430 which represents a computing system with a communicative connected to network 202. Those of ordinary skill in the art will appreciate that additional or alternate system configurations of wireless interaction device 406, storage device 420, and interaction communication device 430 may be implemented.

Figure 5:
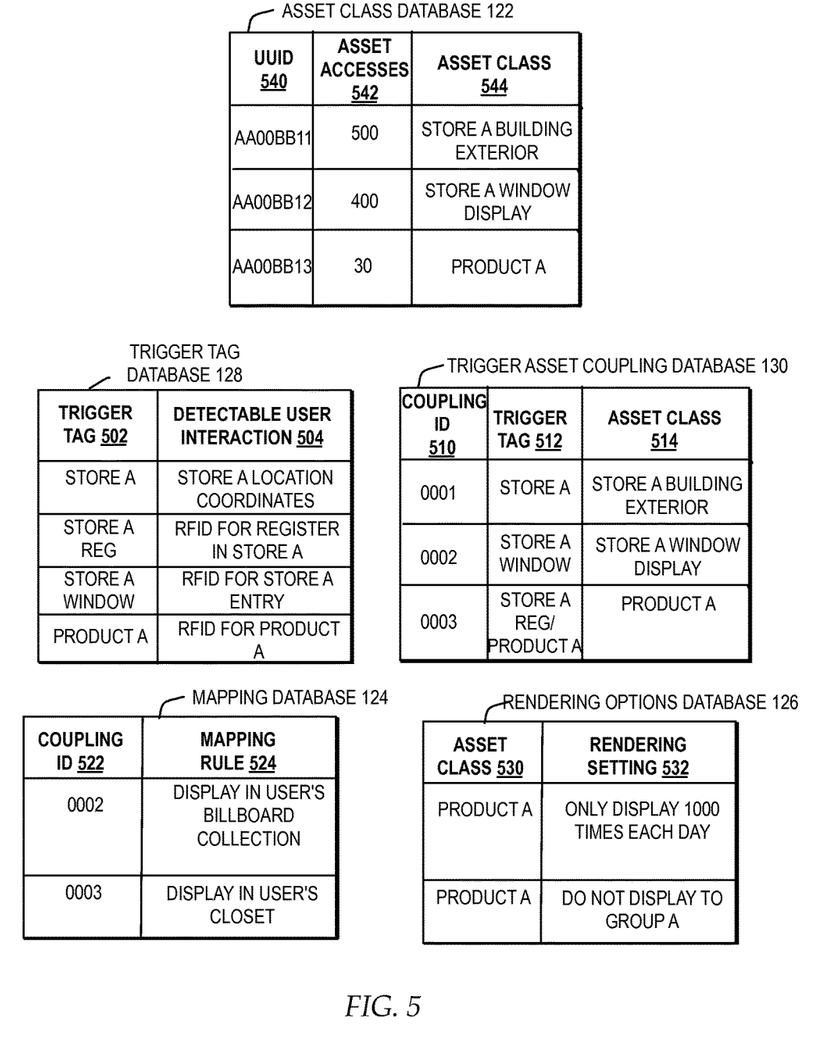
FIG. 5 is a block diagram depicting examples of parameters set within the databases providing location based parameters.

With reference now to FIG. 5, a block diagram illustrates examples of parameters set within the databases providing location based parameters. In the example, asset class database 122 as illustrated includes multiple entries labeled with a UUID, as illustrated in column 540 with the first 8 hexadecimal digits of a 32 hexadecimal digital format, with asset access information, as illustrated in column 542, and with an asset class name, as illustrated in column 544. In addition, in the example, trigger tag database 128 as illustrated includes multiple entries labeled with a trigger tag name, as illustrated in column 502, and with a detectable user interaction, as illustrated in column 504. In addition, trigger asset coupling database 130 as illustrates includes multiple entries labeled with a coupling identifier (ID), as illustrated in column 510, a trigger tag name, as illustrated in column 512, and an asset class, as illustrated in column 514. Further, mapping database 124 includes multiple entries labeled with the coupling ID, as illustrated in column 522, and with a mapping rule, as illustrated in column 524. Additionally, rendering options database 126 includes multiple entries labeled with an asset class, as illustrated in column 530, and with a rendering setting, as illustrated in column 532. Although not depicted, an example of parameters set within location based parameters 120 may also include fees set in fee database 136.

In one example, for a detectable user interaction matching "store A location coordinates" in column 504, a trigger tag name of "store A" is indexed into coupling ID "0001" in column 510, which triggers an asset class of "store A building exterior" to be rendered within the virtual environment accessed by a user, responsive to the user's physical interaction in the real world with the location from which "store A location coordinates" can be detected by GPS 410. Asset location controller 132 updates the information tracked for "store A building exterior" in column 542, such as by updating the number of times the asset class is updated in a particular time period. In addition, additional information such as the virtual world user identifier of a user accessing the asset and the time and date of the access may be recorded in column 542 for each asset class.

In another example, for a detectable user interaction matching "RFID for register in store A" in column 504, a trigger tag name of "store A reg" is indexed into coupling ID "0003", which triggers an asset class of "product A". In addition, for a detectable user interaction matching "RFID for product A" in column 504, a trigger tag name of "product A" is indexed into coupling ID "0003", which triggers an asset class of "product A". Coupling ID "0003" is also indexed into a mapping rule of "display in user's closet" in column 524, which triggers rendering the asset class "product A" to be displayed "in user's closet" within the virtual world accessed by a user. In the example, an instance of the asset "product A" may be rendered in the "user's closet" within the virtual world, responsive to the user's physical interaction in the real world with the location from which the RFIDs assigned to "RFID for register store A" or "RFID for product A" can be passively detected by embedded device reader 408. Rendering of "product A" is limited by the rendering settings assigned to "product A" in column 532 of "only display 1000 times each day" and "do not display to group A." In the example, asset location controller 132 would count the number of times the asset class "product A" has been accessed in a day and would determine whether a user interacting with "product A" in the real world, referred to in "group A", is associated with a third party entity hosing the asset class "product A", such that the asset class "product A" is restricted to a particular number of accesses across multiple virtual world environments hosted by a virtual world provider to multiple users and is not provided to users in "group A" who may interact with the embedded trigger location for "product A" multiple times a day in the real world in the normal course of activity. Asset location controller 132 updates the information tracked for "product A" in column 542, such as by updating the number of times the asset class is updated in a particular time period. In addition, additional information such as the virtual world user identifier of a user accessing the asset and the time and date of the access may be recorded in column 542 for each asset class.

In another example, for a detectable user interaction matching "RFID for store A entry" in column 504, a trigger tag name of "store A window" is indexed into coupling ID "0002", which triggers an asset class of "store A window display". Coupling ID "0002" is also indexed into a mapping rule of "display in user's billboard collection", which triggers "store A window display" to be displayed in "user's billboard collection" within the virtual world accessed by the user. In the example, an instance of the asset "store A window display" is rendered in the "user's billboard collection" within the virtual world, responsive to the user's physical interaction in the real world with the locations from which the RFID assigned to "RFID for store A entry" can be passively detected by embedded device reader 408. Asset location controller 132 updates the information tracked for "store A window display" in column 542, such as by updating the number of times the asset class is updated in a particular time period. In addition, additional information such as the virtual world user identifier of a user accessing the asset and the time and date of the access may be recorded in column 542 for each asset class.

The examples in asset class database 122 in column 542 show the number of accesses of each asset class within a particular time period. By recording the number of times an asset class is accessed within a particular time period, a virtual world provider may track information about customer interaction with a particular business location and with the products in that particular business location and provide third party entities with information about customer interactions. In the example, tracking that 500 users interact with the exterior of a building, 400 with a particular window display, and 30 with a particular product within the store provides information about customer flow outside and inside the store. In addition, in the example, tracking the number of users interacting with "product A" allows virtual world controller 100 to apply restrictions on access specified in rendering options database 126.

Figure 6:
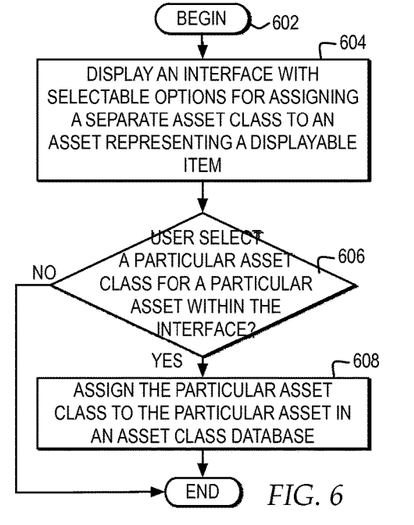
FIG. 6 is a high level logic flowchart illustrating a process and program for a setting asset classes.

Referring now to FIG. 6, a high level logic flowchart illustrates a process and program for a setting asset classes. In the example, the process starts at block 602 and thereafter proceeds to block 604. Block 604 illustrates displaying an interface with selectable options for assigning a separate asset class to an asset representing a displayable item. Next, block 606 depicts a determination whether a user has selected a particular asset class for a particular asset within the interface. If the user does not select a particular asset class for a particular asset, then the process ends. If the user does select a particular asset class for a particular asset, then the process passes to block 608. Block 608 illustrates assigning the particular asset class to the particular asset, as specified by a UUID or other identifier, in an asset class database, and the process ends.

Figure 7:
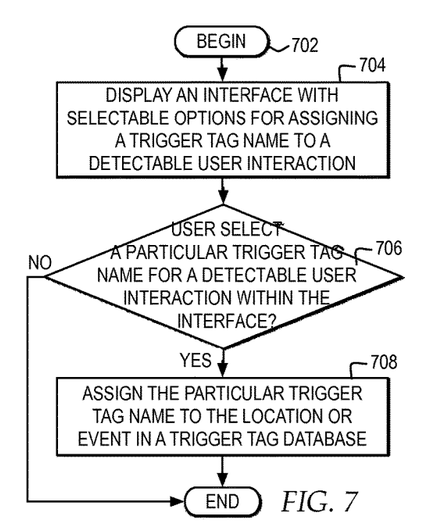
FIG. 7 is a high level logic flowchart depicting a process and program for setting trigger tags

With reference now to FIG. 7, a high level logic flowchart depicts a process and program for setting trigger tags. In the example, the process starts at block 702 and thereafter proceeds to block 704. Block 704 depicts displaying an interface with selectable options for assigning a trigger tag name to detectable user interaction. Next, block 706 illustrates a determination whether a user selects a particular trigger tag name for a detectable user interaction within the interface. If the user does not select a particular trigger tag name, then the process ends. If the user selects a particular trigger tag name, then the process passes to block 708. Block 708 depicts assigning the particular trigger tag name to the detectable user interaction in a trigger tag database, and the process ends.

Figure 8:
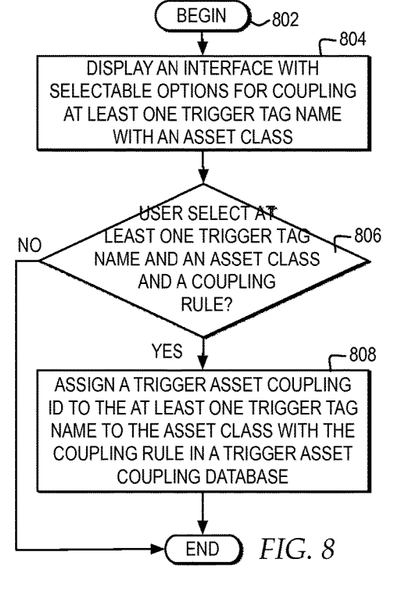
FIG. 8 is a high level logic flowchart illustrating a process and program for setting trigger asset couplings.

Referring now to FIG. 8, a high level logic flowchart illustrates a process and program for setting trigger asset couplings. In the example, the process starts at block 802 and thereafter proceeds to block 804. Block 804 depicts displaying an interface with selectable options for coupling at least one trigger tag name with an asset class. Next, block 806 illustrates a determination whether a user selects at least one trigger tag name and an asset class and a coupling rule. If the user does not select a trigger tag name, asset class, and coupling rule, then the process ends. If the user selects a trigger tag name, an asset class, and a coupling rule, then the process passes to block 808. Block 808 depicts assigning a trigger asset coupling ID to the at least one trigger tag name to the asset class with the coupling rule in a trigger asset coupling database.

Figure 9:
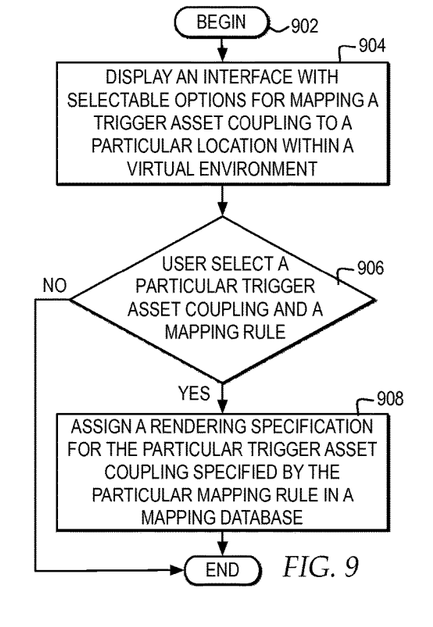
FIG. 9 is a high level logic flowchart depicting a process and program for setting trigger mappings.

With reference now to FIG. 9, a high level logic flowchart depicts a process and program for setting trigger mappings.

In the example the process starts at block 902 and thereafter proceeds to block 904. Block 904 depicts displaying an interface with selectable options for mapping a trigger asset coupling to a particular location within a virtual environment. Next, block 906 illustrates a determination whether a user selects a particular trigger asset coupling and a particular mapping rule. If a user does not select a trigger asset coupling and mapping rule, then the process ends. If a user selects a trigger asset coupling and a mapping rule, then the process passes to block 908. Block 908 depicts assigning a rendering specification for the particular trigger asset coupling specified by the mapping rule in a mapping database, and the process ends.

Figure 10:
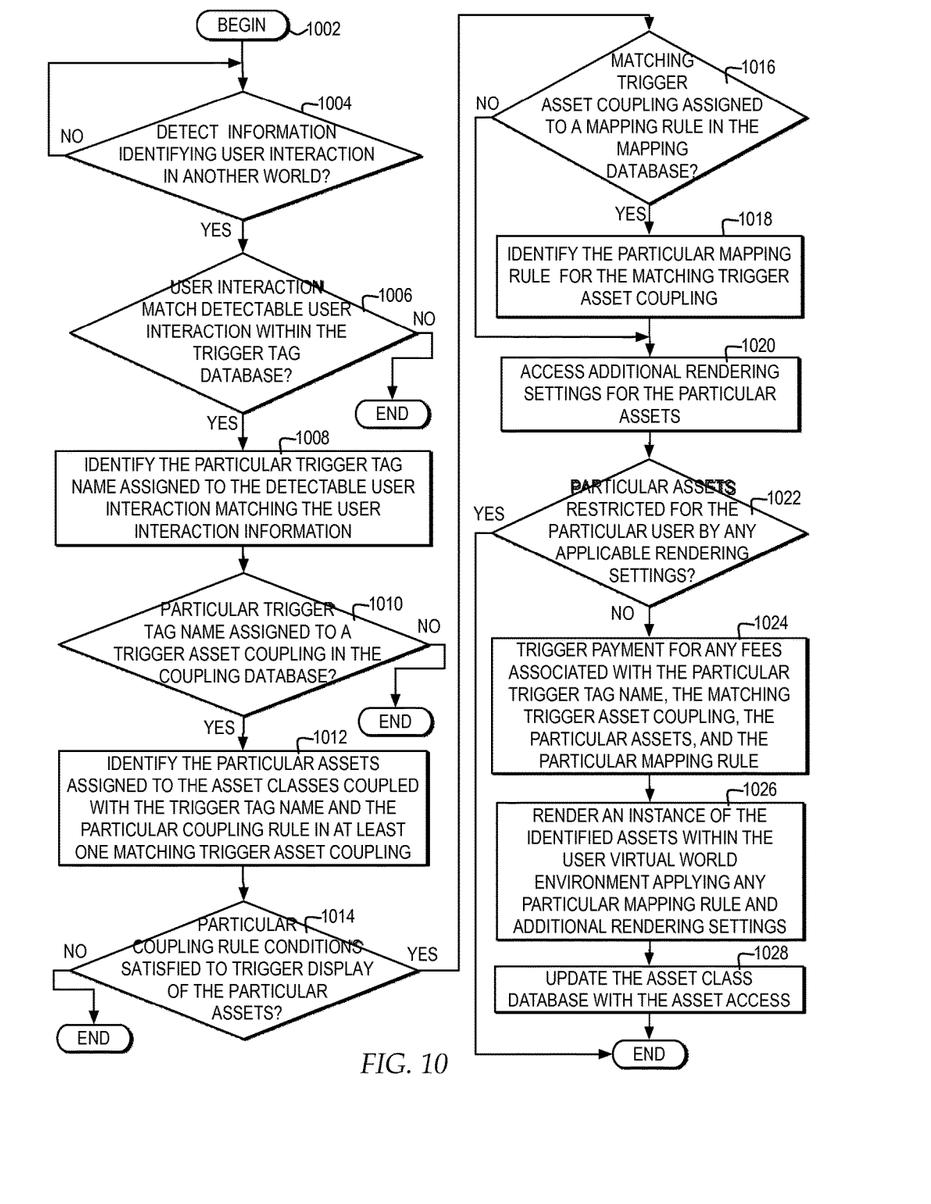
FIG. 10 is a high level logic flowchart illustrating a process and program for updating assets rendered in a virtual world environment based on tracked user interactions within another world.

Referring now to FIG. 10, a high level logic flowchart illustrates a process and program for updating assets rendered in a virtual world environment based on tracked user interactions within another world. In the example, the process starts at block 1002 and thereafter proceeds to block 1004. Block 1004 illustrates a determination whether information identifying a user interaction in another world is detected. If information identifying a user interaction in another world is detected, then the process passes to block 1006. Block 1006 depicts a determination whether user interaction information matches a detectable user interaction location or event within the trigger tag database. If there is a match in block 1006, then the process passes to block 1008.

Block 1008 illustrates identifying the particular tag name assigned to the detectable user interaction matching the user interaction information. Next, block 1010 depicts a determination whether the particular trigger tag name is assigned to a trigger asset coupling in the coupling database. If the trigger tag name is assigned to a trigger asset coupling, then process passes to block 1012. Block 1012 illustrates identifying the particular assets assigned to the asset classes coupled with the trigger tag name and the particular coupling rule in at least one matching trigger asset coupling. Next, block 1014 depicts a determination whether the particular coupling rule conditions are satisfied to trigger display of the particular assets. If the conditions of the particular coupling rule are satisfied, then the process passes to block 1016.

Block 1016 depicts a determination whether the matching trigger asset coupling is assigned to a mapping rule in the mapping database. If the matching trigger asset coupling is assigned to a mapping rule in the mapping database, then the process passes to block 1018. Block 1018 illustrates identifying the particular mapping rule assigned to the matching trigger asset coupling, and the process passes to block 1020.

Returning to block 1016, if the matching trigger asset coupling is not assigned to a mapping rule in the mapping database, then the process passes to block 1020. Block 1020 illustrates accessing additional rendering settings selected by the user. Next, block 1022 depicts a determination whether the particular assets triggered are restricted for the particular user by any applicable rendering settings. If the particular assets are restricted for the particular user by any applicable rendering settings, then the process ends. If the particular assets are not restricted for the particular user, then the process passes to block 1024. Block 1024 depicts triggering payment for any fees associated with the particular trigger tag name, the matching trigger asset coupling, the particular assets, and the particular mapping rule. Thereafter, block 1026 illustrates rendering an instance of the particular assets within the user virtual world environment applying any particular mapping rule and additional rendering settings. Next, block 1028 depicts updating the particular asset entries in the asset class database with the asset accesses for the particular user, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:

outputting, by one or more computer systems, a settings interface through which a user selects from among a plurality of selectable options to specify one or more data associations in a plurality of databases accessed by an asset location controller, to selectively assign a detected user interaction in another world to a displayable rendering in a virtual world, based on a selection of the one or more data associations applicable to the detected user interaction and the virtual world, wherein the detected user interaction identified within the another world is within a real world separate from the virtual world accessible by the user, the detected user interaction received in an identifier from a device that detects and reports user interactions within the another world, wherein the user is an individual user;

displaying, by the one or more computer systems, the settings interface comprising first a particular selectable option from among the plurality of selectable options to specify the one or more data associations by assigning a separate trigger tag name to a detectable user interaction, the detectable user interaction matching the detected user interaction, wherein the device that detects and reports user interactions within the another world receives the identifier from a radio frequency identification device (RFID) positioned within the real world, the RFID reporting a current location and product information to the device when readable by the device with the user within the real world;

displaying, by the one or more computer systems, the settings interface comprising a second particular selectable option from among the plurality of selectable options to specify the one or more data associations by assigning a separate asset class from among a plurality of asset classes to an asset from among a plurality of assets each representing a separate displayable item from among a plurality of displayable items for rendering in the virtual world, each separate asset class comprising a separate name, a user identifier for the user, and a virtual world identifier for the virtual world;

displaying, by the one or more computer systems, the settings interface comprising a third selectable option from among the plurality of selectable options to specify the one or more data associations by specifying a mapping of a separate trigger asset coupling identifier from among a plurality of trigger asset coupling identifiers to a separate location from among a plurality of locations within the virtual world;

responsive to the user selecting, through the settings interface, one or more particular selectable options to enter one or more particular data associations for one or more particular databases of the plurality of databases, assigning, by the one or more computer systems, the one or more particular data associations to the one or more particular databases for specifying the displayable rendering of the detected user interaction in the another world to the displayable rendering in the virtual world;

responsive to the user selecting, through the settings interface, a particular trigger tag name for the detectable user interaction, assigning, by the one or more computer systems, the particular trigger tag name to the detectable user interaction in a trigger tag database from among the plurality of databases, wherein the trigger tag database comprises a plurality of trigger tag names each assigned to a separate detectable user interaction from among a plurality of detectable user interactions each representing a separate physical user interaction detectable in the another world;

responsive to the user selecting, through the settings interface, a particular asset class for a particular asset from among the plurality of assets representing a particular displayable item from among the plurality of displayable items, assigning, by the one or more computer systems, the one or more particular data associations comprising the particular asset class assigned to the particular asset in an asset class database from among the plurality of databases, wherein the asset class database comprises the plurality of asset classes each assigned a separate asset from among the plurality of assets; and responsive to the user selecting, through the settings interface, a particular trigger asset coupling identifier from among the plurality of trigger asset coupling identifiers and a particular location from among the plurality of locations, assigning, by the one or more computer systems, a particular mapping rule for specifying the displayable rendering in the virtual world of an asset class assigned to the particular trigger asset coupling identifier in the particular location within the virtual world in a mapping data database from among the plurality of databases, limited to a time period specified in the particular mapping rule, the mapping database comprising a plurality of mapping rules each specifying the displaying rendering of each separate asset class assigned to the particular trigger asset coupling identifier identifiers at a separate location from among the plurality of locations, the particular trigger asset coupling identifier coupling each separate asset class with at least one separate trigger tag name, the at least one separate trigger tag name assigned to a particular detectable user interaction from among a plurality of detectable user interactions in the another world.

2. The method according to claim 1, further comprising:

displaying, by the one or more computer systems, the settings interface comprising a fourth selectable option from among the plurality of selectable options to specify the one or more data associations by specifying a coupling of the at least one separate trigger tag name from among the plurality of trigger tag names with the particular asset class from among the plurality of separate asset classes; and responsive to the user selecting, through the settings interface, the particular trigger tag name from among the plurality of trigger tag names and the particular asset class from among the plurality of asset classes, assigning, by the one or more computer systems, a particular trigger asset coupling identifier to the particular trigger tag name and the particular asset class in a trigger asset coupling database from among the plurality of databases, the trigger asset coupling database comprising a plurality of trigger asset coupling identifiers each associated with a combination of a separate at least one trigger tag name from among the plurality of trigger tag names coupled with a separate asset class from among the plurality of asset classes.

3. The method according to claim 1, wherein responsive to the user selecting, through the settings interface, one or more particular selectable options to enter one or more particular data associations for one or more particular databases of the plurality of databases, assigning, by the one or more computer systems, the one or more particular data associations to the one or more particular databases for specifying the displayable rendering of the detected user interaction in the another world to the displayable rendering in the virtual world further comprises:

assigning, by the one or more computer systems, the one or more particular data associations to the one or more particular databases for specifying the displayable rendering of the detected user interaction of the user in the another world to the displayable rendering in the virtual world.

4. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to output a settings interface through which a user selects from among a plurality of selectable options to specify one or more data associations in a plurality of databases accessed by an asset location controller to selectively assign a detected user interaction in another world to a displayable rendering in a virtual world based on a selection of the one or more data associations applicable to the detected user interaction and the virtual world, wherein the detected user interaction identified within the another world is within a real world separate from the virtual world accessible by the user, the detected user interaction received in an identifier from a device that detects and reports user interactions within the another world, wherein the user is an individual user;

program instructions to display the settings interface comprising first a particular selectable option from among the plurality of selectable options to specify the one or more data associations by assigning a separate trigger tag name to a detectable user interaction, the detectable user interaction matching the detected user interaction, wherein the device that detects and reports user interactions within the another world receives the identifier from a radio frequency identification device (RFID) positioned within the real world, the RFID reporting a current location and product information to the device when readable by the device with the user within the real world;

program instructions to display the settings interface comprising a second particular selectable option from among the plurality of selectable options to specify the one or more data associations by assigning a separate asset class from among a plurality of asset classes to an asset from among a plurality of assets each representing a separate displayable item from among a plurality of displayable items for rendering in the virtual world, each separate asset class comprising a separate name, a user identifier for the user, and a virtual world identifier for the virtual world;

program instructions to display the settings interface comprising a third selectable option from among the plurality of selectable options to specify the one or more data associations by specifying a mapping of a separate trigger asset coupling identifier from among a plurality of trigger asset coupling identifiers to a separate location from among a plurality of locations within the virtual world;

program instructions, responsive to the user selecting, through the settings interface, one or more particular selectable options to enter one or more particular data associations for one or more particular databases of the plurality of databases, to assign the one or more particular data associations to the one or more particular databases for specifying the displayable rendering of the detected user interaction in the another world to the displayable rendering in the virtual world;

program instructions, responsive to the user selecting, through the settings interface, a particular trigger tag name for the detectable user interaction, to assign the particular trigger tag name to the detectable user interaction in a trigger tag database from among the plurality of databases, wherein the trigger tag database comprises a plurality of trigger tag names each assigned to a separate detectable user interaction from among a plurality of detectable user interactions each representing a separate physical user interaction detectable in the another world;

program instructions, responsive to the user selecting, through the settings interface, a particular asset class for a particular asset from among the plurality of assets representing a particular displayable item from among the plurality of displayable items, to assign the one or more particular data associations comprising the particular asset class assigned to the particular asset in an asset class database from among the plurality of databases, wherein the asset class database comprises the plurality of asset classes each assigned a separate asset from among the plurality of assets; and program instructions, responsive to the user selecting, through the settings interface, a particular trigger asset coupling identifier from among the plurality of trigger asset coupling identifiers and a particular location from among the plurality of locations, to assign a particular mapping rule for specifying the displayable rendering in the virtual world of an asset class assigned to the particular trigger asset coupling identifier in the particular location within the virtual world in a mapping data database from among the plurality of databases, limited to a time period specified in the particular mapping rule, the mapping database comprising a plurality of mapping rules each specifying the displaying rendering of each separate asset class assigned to the particular trigger asset coupling identifier identifiers at a separate location from among the plurality of locations, the particular trigger asset coupling identifier coupling each separate asset class with at least one separate trigger tag name, the at least one separate trigger tag name assigned to a particular detectable user interaction from among a plurality of detectable user interactions in the another world.

5. The computer system according to claim 4, the stored program instructions further comprising:

program instructions to display the settings interface comprising a fourth selectable option from among the plurality of selectable options to specify the one or more data associations by specifying a coupling of the at least one separate trigger tag name from among the plurality of trigger tag names with the particular asset class from among the plurality of separate asset classes; and program instructions, responsive to the user selecting, through the settings interface, the particular trigger tag name from among the plurality of trigger tag names and the particular asset class from among the plurality of asset classes, assigning, by the one or more computer systems, a particular trigger asset coupling identifier to the particular trigger tag name and the particular asset class in a trigger asset coupling database from among the plurality of databases, the trigger asset coupling database comprising a plurality of trigger asset coupling identifiers each associated with a combination of a separate at least one trigger tag name from among the plurality of trigger tag names coupled with a separate asset class from among the plurality of asset classes.

6. The computer system according to claim 4, wherein the program instructions, responsive to the user selecting, through the settings interface, one or more particular selectable options to enter one or more particular data associations for one or more particular databases of the plurality of databases, to assign the one or more particular data associations to the one or more particular databases for specifying the displayable rendering of the detected user interaction in the another world to the displayable rendering in the virtual world further comprises:

program instructions to assign the one or more particular data associations to the one or more particular databases for specifying the displayable rendering of the detected user interaction of the user in the another world to the displayable rendering in the virtual world.

7. A computer program product comprising one or more computer-readable storage devices, and program instructions, stored on at least one of the one or more storage devices, the stored program instructions comprising:

program instructions to output a settings interface through which a user selects from among a plurality of selectable options to specify one or more data associations in a plurality of databases accessed by an asset location controller to selectively assign a detected user interaction in another world to a displayable rendering in a virtual world based on a selection of the one or more data associations applicable to the detected user interaction and the virtual world, wherein the detected user interaction identified within the another world is within a real world separate from the virtual world accessible by the user, the detected user interaction received in an identifier from a device that detects and reports user interactions within the another world, wherein the user is an individual user;

program instructions to display the settings interface comprising first a particular selectable option from among the plurality of selectable options to specify the one or more data associations by assigning a separate trigger tag name to a detectable user interaction, the detectable user interaction matching the detected user interaction, wherein the device that detects and reports user interactions within the another world receives the identifier from a radio frequency identification device (RFID) positioned within the real world, the RFID reporting a current location and product information to the device when readable by the device with the user within the real world;

program instructions to display the settings interface comprising a second particular selectable option from among the plurality of selectable options to specify the one or more data associations by assigning a separate asset class from among a plurality of asset classes to an asset from among a plurality of assets each representing a separate displayable item from among a plurality of displayable items for rendering in the virtual world, each separate asset class comprising a separate name, a user identifier for the user, and a virtual world identifier for the virtual world;

program instructions to display the settings interface comprising a third selectable option from among the plurality of selectable options to specify the one or more data associations by specifying a mapping of a separate trigger asset coupling identifier from among a plurality of trigger asset coupling identifiers to a separate location from among a plurality of locations within the virtual world;

program instructions, responsive to the user selecting, through the settings interface, one or more particular selectable options to enter one or more particular data associations for one or more particular databases of the plurality of databases, to assign the one or more particular data associations to the one or more particular databases for specifying the displayable rendering of the detected user interaction in the another world to the displayable rendering in the virtual world;

program instructions, responsive to the user selecting, through the settings interface, a particular trigger tag name for the detectable user interaction, to assign the particular trigger tag name to the detectable user interaction in a trigger tag database from among the plurality of databases, wherein the trigger tag database comprises a plurality of trigger tag names each assigned to a separate detectable user interaction from among a plurality of detectable user interactions each representing a separate physical user interaction detectable in the another world;

program instructions, responsive to the user selecting, through the settings interface, a particular asset class for a particular asset from among the plurality of assets representing a particular displayable item from among the plurality of displayable items, to assign the one or more particular data associations comprising the particular asset class assigned to the particular asset in an asset class database from among the plurality of databases, wherein the asset class database comprises the plurality of asset classes each assigned a separate asset from among the plurality of assets; and program instructions, responsive to the user selecting, through the settings interface, a particular trigger asset coupling identifier from among the plurality of trigger asset coupling identifiers and a particular location from among the plurality of locations, to assign a particular mapping rule for specifying the displayable rendering in the virtual world of an asset class assigned to the particular trigger asset coupling identifier in the particular location within the virtual world in a mapping data database from among the plurality of databases, limited to a time period specified in the particular mapping rule, the mapping database comprising a plurality of mapping rules each specifying the displaying rendering of each separate asset class assigned to the particular trigger asset coupling identifier identifiers at a separate location from among the plurality of locations, the particular trigger asset coupling identifier coupling each separate asset class with at least one separate trigger tag name, the at least one separate trigger tag name assigned to a particular detectable user interaction from among a plurality of detectable user interactions in the another world.

8. The computer program product according to claim 7, the stored program instructions further comprising:

program instructions to display the settings interface comprising a fourth selectable option from among the plurality of selectable options to specify the one or more data associations by specifying a coupling of the at least one separate trigger tag name from among the plurality of trigger tag names with the particular asset class from among the plurality of separate asset classes; and program instructions, responsive to the user selecting, the particular trigger tag name from among the plurality of trigger tag names and the particular asset class from among the plurality of asset classes, assigning, by the one or more computer systems, a particular trigger asset coupling identifier to the particular trigger tag name and the particular asset class in a trigger asset coupling database from among the plurality of databases, the trigger asset coupling database comprising a plurality of trigger asset coupling identifiers each associated with a combination of a separate at least one trigger tag name from among the plurality of trigger tag names coupled with a separate asset class from among the plurality of asset classes.

9. The computer program product according to claim 7, wherein the program instructions, responsive to the user selecting, through the settings interface, one or more particular selectable options to enter one or more particular data associations for one or more particular databases of the plurality of databases, to assign the one or more particular data associations to the one or more particular databases for specifying the displayable rendering of the detected user interaction in the another world to the displayable rendering in the virtual world further comprises:

program instructions to assign the one or more particular data associations to the one or more particular databases for specifying the displayable rendering of the detected user interaction of the user in the another world to the displayable rendering in the virtual world.

\* \* \* \* \*